INVENTORS
WALTER HOFMANN
RUDOLF NILL

BY Dicke & Craig

ATTORNEYS

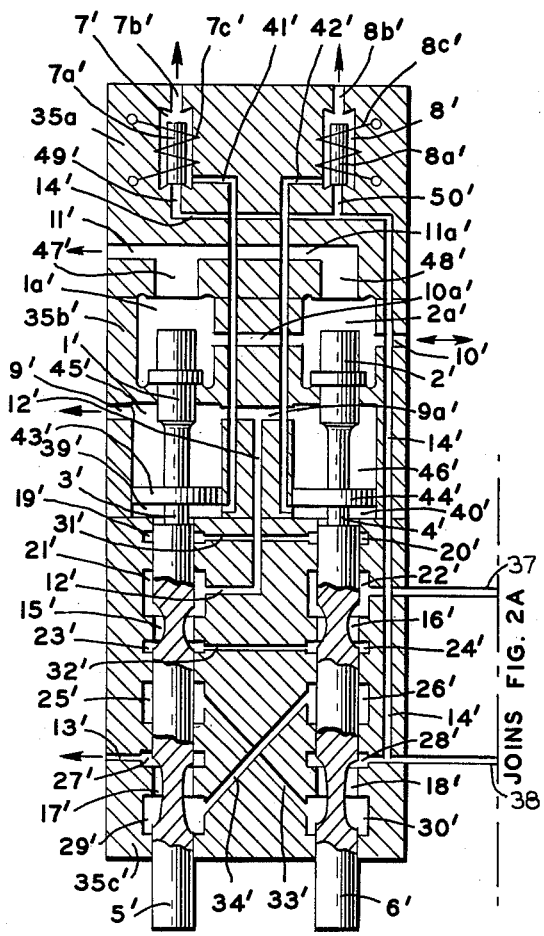

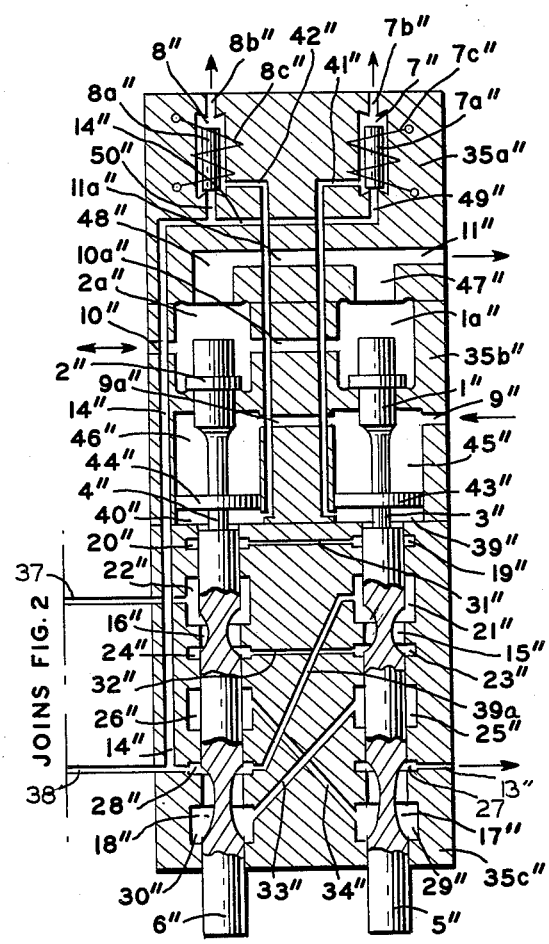

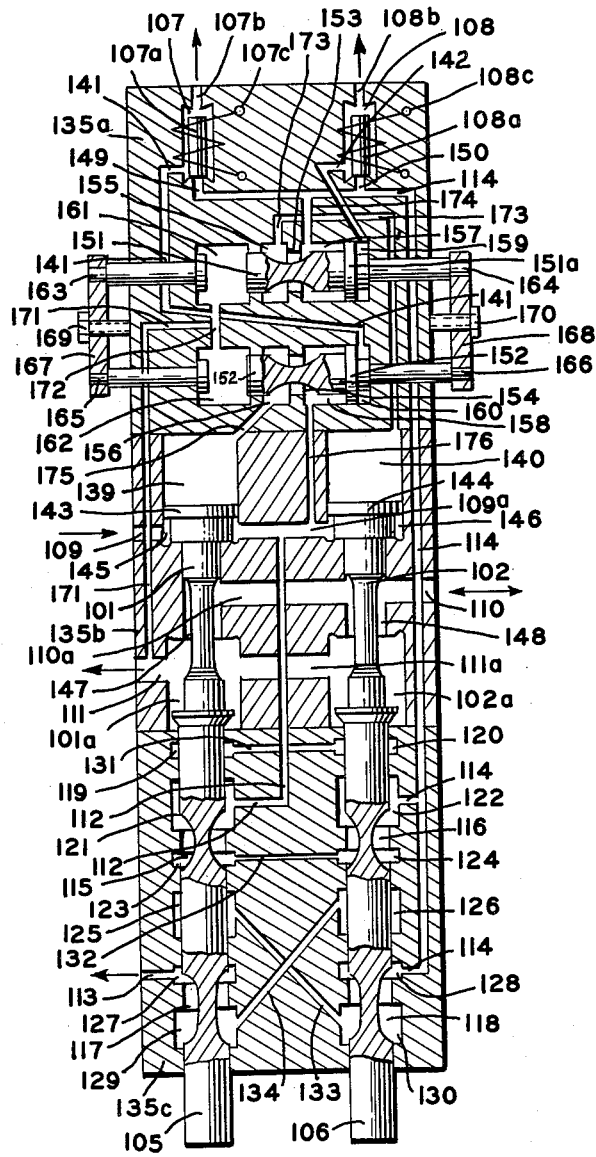

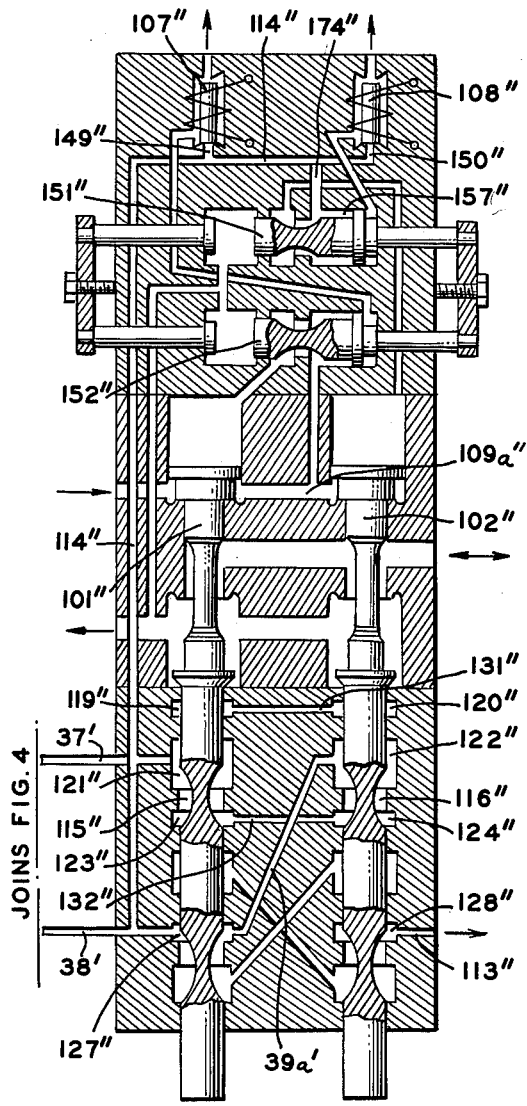

United States Patent Office 3,108,612
Patented Oct. 29, 1963

3,108,612
VALVE MECHANISM FOR CONTROLLING PNEUMATIC OR HYDRAULIC APPARATUS
Walter Hofmann, Stuttgart, and Rudolf Nill, Hohenhaslach, Kreis Vaihingen, Wurttemberg, Germany, assignors to Concordia Maschinen- und Elektrizitats-Gesellschaft m.b.H., Stuttgart, Germany
Filed Apr. 26, 1960, Ser. No. 24,806
Claims priority, application Germany Apr. 27, 1959
9 Claims. (Cl. 137—596.16)

The present invention relates to safety control valves for pneumatically or hydraulically actuated apparatus, particularly for the operation and control of power presses.

For operating and controlling the brakes and clutches of pneumatic or hydraulic presses, it is well known to apply three-way control valves and to combine two of such valves in a parallel assembly to form a double valve. The outlet openings of these valves have a greater cross-sectional size than the inlet openings. If one of the valves in such a parallel assembly fails to operate, the pressure will be released by the other valve and, as the result of the dissymmetry of the flow of pressure medium from the outlet openings of the two valves an electric switch is actuated, for example, for interrupting the supply of current to the press so as to stop its entire operation. Since this switch is operated only very infrequently and usually only after long periods of time, that is, when some disorder occurs in the operation of the valves, the considerable danger prevails that, for example, due to dust, dirt, or corrosion, some of the parts of the valve mechanism will fail to move so that there is no longer any absolute assurance that the switch will operate properly and immediately shut off the current. Furthermore, there is no possibility to ascertain during the normal operation of the press whether or not the control elements are in a condition to operate immediately as soon as a failure might occur. It is, however, an absoslute prerequisite, especially for the operation of power presses, but also of many other types of pneumatic or hydraulic apparatus, that the control means of such apparatus will be properly operative at all times.

It is an object of the present invention to provide a three-way double valve which will fully overcome the above-mentioned disadvantages.

This object will be attained by connecting each of the valve pistons of the two three-way valves to a distributing slide valve and by arranging the control conduits in such a manner that, when the two valve pistons are not in identical positions, the access of the pressure medium to the valves will be blocked, and at the same time, the pressure medium contained within the valves will be discharged. Furthermore, the actuated valve piston, that is, the piston which does not fail to operate, then returns to its initial position. The three-way double valve according to the invention therefore operates at all times entirely foolproof since, unless both valve pistons together with their slide valves move simultaneously during the operation of the machine and are fully in order, the entire machine will be stopped. There are thus no movable parts which normally remain stationary and which might jam and fail to move properly when required.

According to the invention, it is also possible to provide two three-way double valves of the same kind adjacent to each other, for example, for the control of two separate working pistons as used for the operation of the brake and clutch in a power press, and to connect all four associated slide valves with each other in such a manner by means of control passages and additional connecting lines that, if anyone of the valve pistons fails to operate, the flow of pressure medium to all control valves will be blocked, the piston chambers will be opened to discharge the pressure medium, and the actuated valve pistons, that is, those which are not jammed, will return to the initial position.

The three-way double valve according to the invention may also be designed so as to permit the individual control functions to be delayed. This may be attained by providing additional preliminary slide valves and interposing these slide valves between the main valve pistons and thier distributing slide valves and the associated electromagnetic control valves, and providing suitable control and connecting passages between these elements. The extent of the movement of the control pistons of the two preliminary slide valves may be adjusted from the outside so as to delay the opening or closing movements of the three-way double valve to any desired extent. Also in this case, provision is made to insure that the entire operation will be stopped if any kind of disturbance occurs in the proper function of the valves outside so as to delay the opening or closing movements of the three-way double valve to any desired extent. Also in this case provision is made to insure that the entire operation will be stopped if any kind of disturbance occurs in the proper function of the valves.

These and other objects, features, and advantages of the present invention will become more clearly apparent from the following detailed description thereof, particularly when the same is read with reference to the accompanying diagrammatical drawings, in which—

FIGURES 2, 2A show a similar view of two similar valves according to FIGURE 1 associated with each other for different control functions, for example, for operating the brake and the clutch of a power press;

FIGURE 3 shows a cross section of a three-way double valve according to a modification of the invention, which is provided with means for delaying the control functions; while FIGURES 4, 4A show a similar view of two similar valves according to FIGURE 3 associated with each other in a manner similar to FIGURES 2, 2A.

Figure 1:
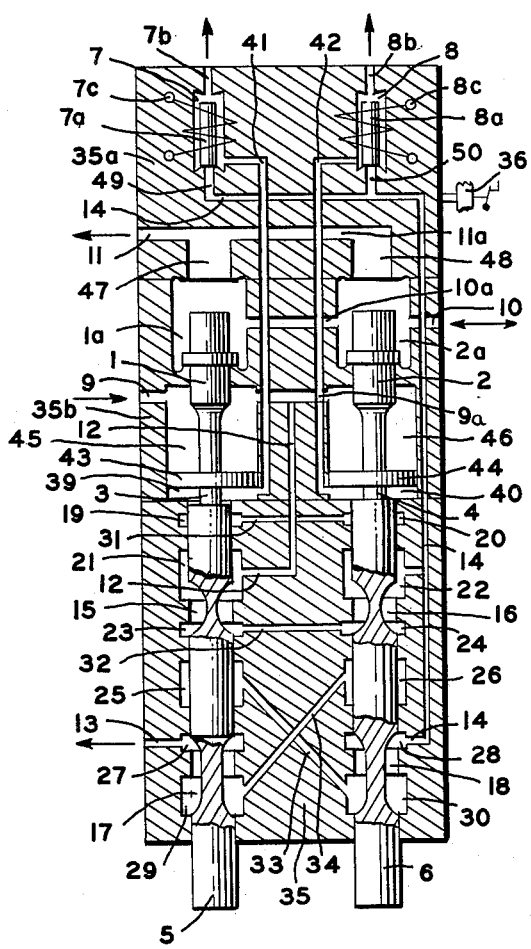
FIGURE 1 shows a cross section of a three-way double valve according to the invention in its initial position.

Referring to FIGURE 1 of the drawings, the valve block or valve housing may be composed of several parts 35a, 35b, 35c in which two three-way valves 1 and 2 are arranged in accordance with the servo-piston principle and are positively connected by connecting parts 3 and 4 to distributing slide valves 5 and 6. The associated electromagnetic control valves 7 and 8 with the usual outlets 7b and 8b and the solenoids 7c and 8c are adapted to control the servo-piston chambers 39 and 40 through connecting passages 41 and 42.

The pressure medium is supplied through inlet passages 9 and 9a to piston chambers 45 and 46 of valves 1 and 2, respectively, while the working chambers 1a and 2a of these valves communicate either with the power lines 10 and 10a leading to the piston cylinder of the machine to be controlled, or with outlet passages 11 and 11a, depending upon the position of the valves. The two electromagnetic control valves 7 and 8 are also connected through passages 49 and 50 to the control-valve passages 14, while the control medium is supplied to the control valves through passage 12 which in turn, is connected to inlet passage 9, 9a. The control outlet passage toward the outside is indicated at 13.

The two slide valves 5 and 6 are provided with upper control recesses 15 and 16 and lower control recesses 17 and 18, respectively. The lower part 35c of the valve housing containing slide valves 5 and 6 further contains a number of annular recesses in the cylinders of the two slide valves. The annular recesses 19 and 20 are connected with each other through a channel 31, the annular recess 21 around slide valve 5 communicates with the control feed passage 12, while the corresponding recess 22 around slide valve 6 communicates with the control-valve passage 14. The two next lower annular recesses 23 and 24 communicate with each other through a connecting channel 32, while the next lower annular recess 25 around valve 5 communicates with the lowest annular recess 30 around valve 6 through an inclined channel 33, and the annular recess 26 around valve 6 communicates with the lowest annular recess 29 around valve 5 through a similar inclined channel 34. Finally, the annular recess 27 around slide valve 5 is connected with the control outlet passage 13, while the corresponding recess 28 around valve 6 at the same level as recess 27 is connected with the control valve passage 14. The annular recesses 19, 20, 23, 24, 27, and 28 are considerably narrower than the annular recesses 21, 22, 25, 26, 29, and 30.

FIGURE 1 illustrates the three-way double valve in its initial or starting position. The pneumatic or hydraulic pressure medium then flows through the inlet passages 9 and 9a to piston chambers 45 and 46 of valves 1 and 2, respectively, and in the form of a control medium through the control feed passage 12, annular recess 21, control recess 15 in slide valve 5, annular groove 23, connecting channel 32, annular recess 24, control recess 16, in slide valve 6, annular recess 22, control-valve passage 14, and connections 49 and 50 to the solenoid-operated control valves 7 and 8. The flow to control outlet passage 13 is then blocked.

If both control valves 7 and 8 are then actuated, their armatures 7a and 8a will be lifted, permitting the control medium to flow through passages 41 and 42 into piston chambers 39 and 40, whereby servo pistons 43 and 44 of valve 1 and 2 together with their associated slide valves 5 and 6 will be lifted to substantially identical operative position for effecting the desired operation and control of power presses for example. The pressure medium will then flow from inlet passages 9 and 9a through chambers 1a and 2a and passages 10 and 10a to the piston chamber of the respective apparatus to be operated (not shown). The lifting of slide valves 5 and 6 also changes the positions of control recesses 15 to 18 so that the control medium will then flow through parts 12, 21, 15, 19, 31, 20, 16, 22, 14, 49, and 50 to control valves 7 and 8 and then through passages 41 and 42 to servo pistons 43 and 44 to lift the same. The control outlet passage 13 still remains blocked. When the control valves 7 and 8 are switched off, servo pistons 43 and 44, and thus also slide valves 5 and 6, return to their initial position, while the pressure is released from chambers 1a and 2a through outlet passages 11 and 11a.

If at an actuation of the three-way double valve one of the two control valves 7 or 8 should for some reason fail to operate, and if for this or any other reason one of the two slide valves 5 or 6 should fail to move, the access of the control medium to the servo pistons 43 and 44 will be blocked automatically. If, for example, only slide valve 5 is lifted, the control medium can flow through parts 12, 21, 15, 19, and 31 only to the annular recess 20, since the access to control-valve passage 14 will remain blocked by the piston of slide valve 6. The control medium within this passage 14 will then be released toward the outside through parts 28, 18, 30, 33, 25, 17, 27, and 13. The work piston of the respective apparatus to be operated will thus not receive any pressure and will not be able to move.

The same occurs if slide valve 5 fails to move and slide valve 6 is lifted. The supply of control medium will also in that case be blocked and the pressure medium contained in the control valve passages will be released toward the outside.

If desired, it is easily possible to connect a pressure-responsive control relay 36 of any suitable type to the control valve passage 14. This relay may be designed so that its contact will open when the pressure in passage 14 is released entirely or down to a certain minimum. Thus, if some disorder occurs in the operation of the valve unit, control relay 36 may actuate a main control relay which will interrupt the operation of the entire apparatus or machine until the cause of the disorder has been removed, or it may directly switch off the current to solenoids 7c and 8c. If desired, it is also possible to utilize such a control relay 36 for actuating an optical or accoustic signal device for indicating the occurrance of such a failure.

While FIGURE 1 illustrates a three-way double valve for controlling the operation of a single work piston of a machine, FIGURES 2, 2A illustrate a corresponding arrangement for two work pistons, for example, for operating the brake and clutch of a power press. In such a case, two three-way double valve units of substantially the same construction as shown in FIGURE 1 are arranged side-by-side, although in an inverse relationship to each other. The individual parts of both valve units according to FIGURES 2, 2A are identified by the same reference numerals as those in FIGURE 1, except that a prime is added to each numeral. The upper parts 35a and 35b of the valve block or housing are identical in shape and construction to those shown in FIGURE 1, and only the lower part 35c differs slightly fron that according to FIGURE 1 insofar as the different connecting channels are concerned.

Thus, the parts of FIGURE 2 which correspond to parts 1, 1a, 2, 2a, etc. up to 50 in FIGURE 1 are marked 1', 1'a, 2', 2'a, etc. up to 50', while those of FIGURE 2A are marked 1", 1"a, 2", 2"a etc. to 50". The two valve units are connected to each other by conduits 37 and 38. Thus, the two annular recesses 22' and 22" of the slide valves 6' and 6" of FIGURES 2 and 2A communicate through the connecting conduit 37, while the two annular recesses 28' and 28" of the same slide valves communicate through connecting conduit 38. Conduit 38 is additionally connected with the control valve passage 14' and 14" of the two valve units. Finally, instead of being connected with the control feed passage 12' as in the valve unit of FIGURE 2, the annular recess 21" of the valve unit of FIGURE 2A is connected with the annular recess 28" around slide valve 6" through an inclined passage 39a.

Due to the mentioned connecting conduits, the control valve passages 14' and 14" of both valve units will not receive any supply of control medium in the event of a failure in operation of any individual valve. If, for example, slide valve 5" of the valve unit of FIGURE 2A does not return to its initial position when the control valves 7" and 8" are switched off, the control medium will flow from the control feed passage 12' through parts 21', 15', 23', 32', 24', 16', 22' and then through conduit 37 and parts 22", 16", 24", 32" to the annular recess 23". At this point, the raised slide valve 5" will block the further flow of the control medium, while the medium contained in the control-valve passages 14' and 14" will be discharged through outlet passages 13" of the right valve unit.

The same effect occurs if any other slide valve remains in the raised position or if any one of the four slide valves when actuated remains in its initial position. Thus, in this embodiment as well as in the embodiment according to FIGURE 1, the failure of any individual valve will interrupt the operation of the entire valve unit, and all of the slide valves which have been lifted will also return to their initial position, the respective pneumatic or hydraulic operations of the machine will be interrupted, and the pressure in the cylinder or cylinders thereof containing the work pistons will also be released. Obviously, if desired, a control relay 36 may also be connected to one or both control valve passages 14' and 14" in the same manner as described with reference to FIGURE 1.

FIGURE 3 illustrates a three-way double valve according to a modification of the invention, but designed according to the same principles as the embodiment according to FIGURE 1. It is likewise shown in the initial or starting position, and the various parts thereof are marked with the same numerals as in FIGURE 1, except that they are raised to three decimals. Thus, parts 101, 101a, 102, 102a, etc., up to 150 in FIGURE 3 correspond to parts 1, 1a, 2, 2a, etc. to 50 in FIGURE 1. The lower part 135c of the valve block in FIGURE 3 including its different built-in parts corresponds to part 35c in FIGURE 1. Also the central part 135b of the valve block including its built-in parts corresponds to part 35b in FIGURE 1, except that, in order to simplify the illustrated parts 101 and 143 and parts 102 and 144 are reversed in order as compared with parts 1 and 43 and parts 2 and 44 in FIGURE 1. The upper part 135a of the valve block in FIGURE 3 including its control valves corresponds to the upper part 35a of the valve block in FIGURE 1, except that additional preliminary slide valves together with their associated operating elements and control passages are provided therein in order to delay the various control functions as may be desired.

This upper part 135a of the valve block contains two preliminary slide valves 151 and 152 which extend parallel to each other and transverse to the axes of valves 101 and 102. Slide valve 151 has a control recess 153 which is associated with an annular recess 155 and a piston chamber 157, while slide valve 152 is provided with a similar control recess 154 which is associated with an annular recess 156 and a piston chamber 158. Piston chambers 157 and 158 contain the control pistons 151a and 152a, respectively. Adjacent to one end of slide valves 151 and 152, the valve block contains the two chambers 161 and 162, and adjacent to the other end the two servo chambers 159 and 160. Slide valves 151 and 152 are further adapted to engage at one side with movable stop bolts 163 and 165 and at the other side with similar stop bolts 164 and 166. The shafts of these bolts extend through and are slidable in the valve block part 135a, and the outer ends thereof are connected at one side by a plate 167 and at the other side by a plate 168. Each of these two connecting plates 167 and 168 is slidable on a bolt which is secured to the valve block and carries a nut 169 or 170, respectively, by means of which the respective pair of stop bolts 163 and 165 or 164 and 166 may be adjusted from the outside to vary the length of the stroke of the two slide valves 151 and 152 in both directions, which is shown in FIGURE 3 as being set to its maximum length.

The two chambers 161 and 162 communicate with each other through a connecting channel 172 from which a passage 171 branches off to the outlet passage 111. The annular recess 155 communicates with the servo-piston chamber 140 through a passage 173 and the annular recess 156 communicates with servo-piston chamber 139 through a passage 175. Piston chamber 157 is further connected through a passage 174 with the control-valve passage 114, while piston chamber 158 is connected to inlet passage 109a through a passage 176. Further, servo-chamber 159 communicates with the solenoid-operated control valve 108 through a connecting passage 142, while servo chamber 160 communicates with control valve 107 through a connecting passage 141.

The pressure medium flows through the inlet passage 109 into piston chamber 145 and through inlet passage 109a into piston chamber 146. Serving as a control medium, the pressure medium also flows from inlet passage 109a through the parts 176, 158, 154, 156, and 175 into the servo-piston chamber 139 so that the preliminary slide valve 152 as well as valve 101 together with slide valve 105 will be held directly in the initial position.

At the same time, the pressure medium flows as a control medium from the control valve passage 114 through the parts 128, 118, 130, and 133 into the annular recess 125, and also from the control valve passage 114 through parts 149 and 150 to the control valves 107 and 108 which are held in the closed position by their armatures 107 and 108a. The pressure in servo chambers 159 and 160 is released toward the outside through parts 142, 141, 107, 108, 107b and 108b, and chambers 161 and 162 are likewise relieved of pressure through parts 172, 171, and 111. Furthermore, the cylinder of the machine containing the work piston, not shown, which is controlled by the valve unit and is connected to the power line 110 is likewise relieved of pressure through parts 148, 110a, 147, 102a, 101a, 111a and 111. When the control valves 107 and 108 are switched on, the armatures 107a and 108a will be attracted, whereby the outlets 107b and 108b will be closed and the connections 149 and 150 will be opened. The control medium can then flow through the control valves 107 and 108 and through passages 142, 141 into the servo chambers 159 and 160 and act upon pistons 151a and 152a and drive the preliminary slide valves 151 and 152 forwardly until they engage with stop members 163 and 165. This changes the control position of slide valves 151 and 152 so that the control medium will now be released from the servo-piston chamber 139 by flowing to the outside through the parts 175, 156, 154, 162, 172, 171, and 111, and from servo-piston chamber 140 by flowing to the outside through the parts 173, 155, 153, 161, 172, 171, and 111.

The pressure medium in piston chambers 145 and 146 will then shift the position of valves 101 and 102 together with slide valves 105 and 106, whereby the outlets 147 and 148 will be closed toward working chambers 101a and 102a and opened toward piston chambers 145 and 146. The pressure medium will then flow through the inlet passages 109 and parts 145, 147, 109a, 146, 148, and 110a and through the power line 110 to the respective work cylinder of the machine to be controlled.

In this shifted position of slide valves 105 and 106, the control medium will pass in the same manner as in the initial position into piston chamber 158 and annular recess 121. From recess 121 the control medium will then flow contrary to the initial position through parts 115, 119, 131, 120, and 116 into the annular recess 122 and from this point in the same manner as in the initial position through the control valve passage 114 into piston chamber 157 and also into the annular recess 128. From recess 128, the control medium passes through parts 118, 126, and 134 into the annular recess 129 around slide valve 105. At the same time, servo chambers 159 and 160 will be supplied with control medium from the annular recess 122 through parts 114, 149, 150, 107, 108, 141, and 142.

When solenoids 107c and 108c are again switched off and control valves 107 and 108 return to their initial position, servo chambers 159 and 160 will be relieved of pressure, as already described, so that the preliminary slide valves 151 and 152 will likewise return to their initial position. The control medium will then pass from slide valves 151 and 152 into the servo-piston chambers 139 and 140 and act upon servo pistons 143 and 144 to return valves 101 and 102 together with their slide valves 105 and 106 likewise to their initial position. The supply of pressure medium to the work cylinder of the machine is then shut off, and the pressure is released therefrom through parts 110, 148, 110a, 147, 102a, 111a, 101a, and 111 toward the outside. In all of the other parts of the valve unit the control medium remains as in the initial position.

If the opening movement of the three-way valves 101 and 102 is for any special reason to be delayed, nut 169 is to be adjusted accordingly so that, through connecting plate 167, the two stop bolts 163 and 165 will be adjusted relative to the preliminary slide valves 151 and 152. The stroke of the two slide valves 151 and 152 will then become smaller so that the effective width of control recesses 153 and 154 toward chambers 161 and 162 will be reduced. The pressure will therefore be released from the servo-piston chambers 139 and 140 more slowly and the opening movement of valves 101 and 102 will be delayed.

If, on the other hand, the closing movement of valves 101 and 102 is to be delayed so as to permit the pressure from the work cylinder of the respective machine to be released to the outside at a delay, the other nut 170 will be adjusted accordingly. Since the two stop bolts 164 and 166 are likewise connected by connecting plate 168, both stop bolts will be equally adjusted relative to the preliminary slide valves 151 and 152. The stroke of these slide valves will thus be shortened and the effective width of control recesses 153 and 154 toward piston chambers 157 and 158 will be reduced. Consequently, the pressure will be released from the work cylinder through power line 110 at a delay.

If for some reason it should occur that, for example, the preliminary slide valve 152 remains in its initial position when solenoids 107c and 108c are energized, the three-way valve 101 will not shift but remain in its original position. The other three-way valve 102 may then, however, be shifted, but the supply of control medium from the annular recess 124 will be blocked. Servo chambers 159 and 160 and piston chamber 157 will then be relieved of pressure through parts 142, 108, 150, and 141, 107, 149, and 174, and further through parts 114, 128, 118, 126, 134, 129, 117, 127 and the control outlet passage 113, while the servo-piston chamber 140 will be likewise relieved of pressure through parts 173, 155, 153, 161, 172, 171, and 111. Since the cross-sectional size of power line 110 is several times as large as that of the inlet passage 109, no pressure can build up in the work cylinder through power line 110. The preliminary slide valve 151 will remain in the shifted position even though solenoids 107c and 108c are switched off or the current supply is interrupted. Since control valves 107 and 108 will then no longer receive any control medium, valves 101 and 102 will also no longer be moved. Thus, before the respective machine, for example, the press, can again be operated, it is necessary to correct this or any other kind of deficiency and to return the preliminary slide valve 151 and valve 102 together with slide valve 106 to the initial position.

If any kind of failure occurs in the operation of the valve unit, the individual parts thereof will therefore immediately lock each other automatically. Contrary to the embodiment according to FIGURE 1, however, at least one of the two slide valves returns to the initial position. This locking effect continues until the cause of the failure has been removed, and it is impossible to operate the machine until such time. This has the advantage that the three-way double valve can also not be actuated electromagnetically by accident since the work cylinder of the machine will not receive any pressure as long as the failure continues. It is, however, also in this case possible to connect the control valve passage 114 to a control relay similarly as described with reference to FIGURE 1, except that such a relay would be needed only for giving an optical or accoustic alarm to indicate the occurrence of a failure or breakdown.

The three-way dual valve as shown by FIGURE 3 can be utilized also in the form of a twin arrangement of the three-way dual valve, in the same manner as the valve shown by FIGURE 1 is utilized in FIGURES 2, 2A.

Figure 4:
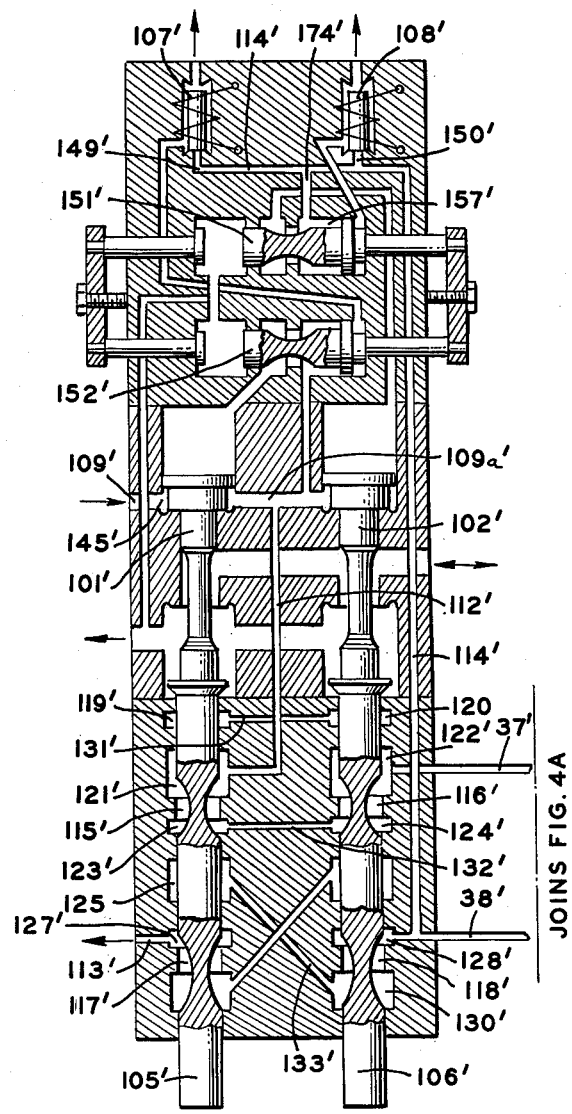

The combination of two valve units of the type shown in FIGURE 3 is illustrated in FIGURES 4 and 4A. These figures show an arrangement wherein two three-way double valves in accordance with FIGURE 3 are connected together in the manner that two valves in accordance with FIGURE 1 have been combined in FIGURES 2 and 2A. Reference numerals used in FIGURES 4 and 4A, although fewer in number in order to simplify the description, are the same as the corresponding numerals occurring in FIGURE 3, but prime and double prime marks, respectively, have been added to these numerals in FIGURE 4 and 4A. In view of the similarities of the structures of FIGURE 3 and FIGURES 4, 4A and the detailed description of the former figure as set forth above, the structure and mode of operation of the arrangement of FIGURES 4, 4A will be entirely apparent from the following description, despite the absence of reference numerals corresponding to some of those of FIGURE 3.

The two three-way double valves of these figures are connected with one another via conduits 37' and 38' whereby, in FIGURE 4, the conduit 37' by-passing the line 114' is connected to the annular groove 122', and line 38' is connected to the annular groove 128'. In the double three-way valve shown in FIGURE 4, these are the only changes as compared to FIGURE 3. In FIGURE 4A, the following changes were made as compared with FIGURE 3: The line 114'' is transferred to the left-hand side of the valve and connected to line 38'. Furthermore, the annular groove 127'' is connected with the annular groove 122'' via the channel 39a'. The annular groove 121'' is connected with line 37', and the annular groove 128'' to the outlet line 113''. Finally, the line (112 in FIGURE 3) between the channel 109a'' and the annular groove 121'', is omitted.

In the arrangement according to FIGURES 4 and 4A, the elements 149', 114', 150', 174', 157', 128', 38', 127'', 39a', 122'', 114'', 149'', 174'', 157'' and 150'' always form a continuous control pressure chamber 149' . . . 150''. When this control pressure chamber 149' . . . 150'' is connected with the control pressure medium entering through the inlet opening 109', the electromagnetic actuated valves 107', 108', 107'' and 108'' can shift the three-way double valves 101', 102', 101'' and 102'' so as to produce a reversal of the three-way valves via the preliminary slide valves 151', 152', 151'' and 152'' in the same manner as has been described in FIGURE 3. When, on the other hand, the control pressure chamber 149' . . . 150'' is in communication with the outlet openings 113' and/or 113'', a switching-on of the three-way valves 101', 102', 101'' and 102'' can no longer be produced via the electromagnetically actuated valves 107', 108', 107'' and 108''.

In the illustrated position, the control pressure medium flows from the inlet opening 109' via elements 145', 109a', 112', 121', 115', 123', 132', 124', 116', 122', 37', 121'', 115'' 123'', 132'', 124'' and 116'' into the annular groove 122'' which, as already set forth, is part of the control pressure chamber 149' . . . 150'', the latter being closed off toward the outlet openings 113' and 113''. The inlet pressure is therefore present in the control chamber 149' . . . 150'' and the three-way double valve is thus operable.

When both three-way valves 101' and 102' of FIGURE 4 together with their respective slide valves 105' and 106' are reversed to the upper position, then the pressure medium entering at 109' also flows into the control pressure chamber 149' . . . 150''. As compared to the path described hereinabove, the pressure medium will then flow via elements 121', 115', 119', 131', 120', 116' and 122' instead of via elements 121', 115', 123', 132', 124', 116' and 122'. When the two three-way valves 101'' and 102'' in FIGURE 4A are also reversed to their upper position, the pressure medium, instead of flowing from the annular groove 121'' via elements 123'', 132'' and 124'', will then flow via elements 119'', 131'' and 120'' to the annular groove 122'' of the control pressure chamber 149' . . . 150''. In both instances, the control pressure chamber 149' . . . 150'' is closed off with respect to the outlet openings 113′ and 113″. The arrangement illustrated in FIGURES 4 and 4A is thus operable when both the three-way double valves 101′, 102′ and the three-way double valves 101″, 102″ are in respectively identical positions so that the double valves may be actuated independently of each other.

When, on the other hand, only the left-hand three-way valve 101′ is placed into the upper position, whereas the three remaining three-way valves remain in the position shown—the three-way valve 102′ is assumed, for example, to be locked—then the pressure medium entering at 109′ flows only to the blocked annular groove 120′ via elements 145′, 109a′, 112′, 121′, 115′, 119′, and 131′ and thus not into the control pressure chamber 149′ . . . 150″ which is now instead relieved via elements 128′, 118′, 130′, 133′, 125′, 117′, 127′ and the outlet opening 113′. The arrangement according to FIGURES 4 and 4A is, in that case, no longer reversible. Corresponding conditions exist also when any other three-way valve assumes a position differing from its corresponding adjacent three-way valve. In the normal operation, the two valve units may then open and close entirely independently of each other, but in the event of any kind of disorder in one or the other valve unit, they will immediately lock each other and cause all working conduits to be relieved of pressure, while at least one of the slide valves of each double-valve unit will return to its initial position. There is no possibility that the electromagnetic control valves might be actuated unless the cause of the disorder has first been removed.

Although our invention has been illustrated and described with reference to the preferred embodiments thereof, we wish to have it understood that it is in no way limited to the details of such embodiments, but is capable of numerous modifications within the scope of the appended claims.

Having thus fully disclosed our invention, what we claim is:

1. A valve mechanism for the operation and control of pneumatic or hydraulic apparatus, comprising at least one three-way double valve unit, said double valve unit comprising a valve housing having piston chambers therein, a pair of valve pistons slidable within said piston chambers to substantially identical operative positions for effecting said operation and control, a slide valve rigidly connected to each of said valve pistons, each of said slide valves having control recesses therein, said valve housing having annular recesses around said slide valves and operatively associated therewith, a pair of electromagnetic control valves within said housing, inlet passages and outlet passages in said housing, and interconnecting means for operatively interconnecting said inlet passages and one of said annular recesses around one of said slide valves, and passage means for operatively connecting said one of said annular recesses with one of said annular recesses around the other one of said slide valves when said pistons assume said identical positions, means including control valve passages operatively connecting said one of said annular recesses around the other one of said slide valves and said electromagnetic control valves, and connecting passages operatively connecting said electromagnetic control valves and said piston chambers, each of said slide valves comprising means interrupting the flow of pressure medium through said passage means in positions of said pistons wherein only one of said pistons occupies its respective operative position.

2. A valve mechanism as defined in claim 1, in which two of said three-way double valve units together having four valve pistons and four slide valves, are operatively associated with each other for separately controlling two pneumatic or hydraulic apparatus, conduit means for connecting said two units, said connecting passages and conduits connecting said four slide valves to each other in such a manner that, if anyone of said valve pistons fails to operate, the flow of pressure medium through both of said units will be interrupted, the pressure remaining within said piston chambers of both units will be released to the outside, and the properly actuated pistons of both units will return to their initial position.

3. A valve mechanism as defined in claim 1, further comprising preliminary slide valves within said housing and operatively interposed between said valve pistons and their associated electromagnetic control valves, said preliminary slide valves having control recesses therein and annular recesses within said housing around said preliminary slide valves, and further passages connecting said recesses with said piston chambers and said control valves, said preliminary slide valves including said control and annular recesses thereof and said further connecting passages being disposed in such a relation to each other and to said valve pistons and control valves that, when said pistons are in their initial position, the pressure medium will act directly upon one of said pistons, at least one of said slide valves which has been actuated will return to its initial position if any part of the valve mechanism fails to operate properly, the pressure lines within said housing and adapted to be connected to the apparatus to be controlled will be relieved of pressure, and a repeated actuation of said electromagnetic control valves will be impossible until the cause of the failure has been removed.

4. A valve mechanism as defined in claim 3, further comprising means operative from the outside of said housing for adjusting the length of the strokes of said preliminary slide valves so as to delay the opening and closing movements of said pistons.

5. A valve mechanism as defined in claim 3, in which two of said three-way double valve units together having four valve pistons and four slide valves are operatively associated with each other for separately controlling two pneumatic or hydraulic apparatus, conduit means for connecting said two units, said connecting passages and conduits connecting said four slide valves to each other in such a manner that both of said valve units will operate independently of each other but, if one of said units fails to operate properly, the elements of both of said units will be prevented from moving.

6. A valve mechanism as defined in claim 1, further comprising a pressure-responsive control relay connected to said control valve passages for effecting a desired control function.

7. A valve mechanism according to claim 1 further comprising further interconnecting means comprising further passage means for operatively connecting said control valve passages and one of said outlet passages in positions of said pistons wherein only one of said pistons occupies its respective operative position.

8. A valve mechanism for the operation and control of pneumatic or hydraulic apparatus comprising two movable members each comprising piston means and valve means, said movable members being movable to identical operative positions, a valve housing enclosing said movable members including piston chambers for said piston means, inlet and outlet means in said housing, means in said housing for moving said movable members to said identical operative positions, said means in said housing including said valve means for establishing a path for pressure fluid between said inlet means and said piston chambers upon assumption of said identical operative positions by said movable members, and means including passage means in said housing for establishing a path for pressure fluid from one of said piston chambers to said outlet means in response to the assumption of only one of said movable members of its respective operative position.

9. A valve mechanism for the operation and control of pneumatic or hydraulic apparatus according to claim 8, wherein said means in said housing further includes annular recesses surrounding and cooperating with said valve means, said means including passage means in said housing further including further annular recesses in said housing for each of said valve means, and control recesses in said valve means disposed within said further annular recesses, said passage means connecting said further annular recesses for one of said valve means with said further annular recesses for the other of said valve means.

References Cited in the file of this patent

UNITED STATES PATENTS

| | | |
|---|---|---|
| 2,636,581 | Bitler | Apr. 28, 1953 |
| 2,650,609 | Herbst | Sept. 1, 1953 |
| 2,754,840 | Hicks | July 17, 1956 |
| 2,878,832 | Hoge | Mar. 24, 1959 |
| 2,906,246 | Di Tirro et al. | Sept. 29, 1959 |